United States Patent
Chang et al.

(10) Patent No.: US 9,832,454 B2
(45) Date of Patent: Nov. 28, 2017

(54) METHOD AND APPARATUS FOR MATCHING STEREO IMAGES

(71) Applicant: Samsung Electronics Co., Ltd., Suwon-si, Gyeonggi-do (KR)

(72) Inventors: Hyun Sung Chang, Seoul (KR); Ouk Choi, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 163 days.

(21) Appl. No.: 14/722,551

(22) Filed: May 27, 2015

(65) Prior Publication Data

US 2016/0150210 A1    May 26, 2016

(30) Foreign Application Priority Data

Nov. 20, 2014    (KR) .................. 10-2014-0162525

(51) Int. Cl.
    *G06K 9/00*     (2006.01)
    *H04N 13/02*     (2006.01)
    *H04N 13/00*     (2006.01)
    *G06T 7/593*     (2017.01)

(52) U.S. Cl.
    CPC ......... *H04N 13/0239* (2013.01); *G06T 7/593* (2017.01); *H04N 13/0007* (2013.01); *G06T 2207/10012* (2013.01); *G06T 2207/10024* (2013.01); *H04N 2013/0081* (2013.01)

(58) Field of Classification Search
    USPC ............................................... 382/154, 106
    See application file for complete search history.

(56) References Cited

U.S. PATENT DOCUMENTS

| | | | |
|---|---|---|---|
| 6,556,704 B1* | 4/2003 | Chen | G06K 9/20 382/154 |
| 7,499,586 B2* | 3/2009 | Agarwala | G06T 3/4038 345/629 |
| 8,571,303 B2 | 10/2013 | Koizumi et al. | |
| 8,659,644 B2 | 2/2014 | Song | |
| 8,670,630 B1* | 3/2014 | Kwatra | G06T 7/0075 358/1.2 |
| 8,737,723 B1* | 5/2014 | Kwatra | G06T 7/0075 345/419 |
| 8,787,654 B2* | 7/2014 | Zhang | H04N 13/0022 345/418 |

(Continued)

FOREIGN PATENT DOCUMENTS

| | | |
|---|---|---|
| JP | 2007259177 A | 10/2007 |
| JP | 4934701 B2 | 5/2012 |

(Continued)

OTHER PUBLICATIONS

X. Mei, "On Building an Accurate Stereo Matching System on Graphics Hardware", IEEE, Nov. 2011, 8 pages.

(Continued)

*Primary Examiner* — Kathleen Y Dulaney
(74) *Attorney, Agent, or Firm* — Harness, Dickey & Pierce, P.L.C.

(57) ABSTRACT

A method for matching stereo images may calculate a data cost value for each of a plurality of images, calculate a smoothness cost value for each of the plurality of images, and match pixels among the plurality of images based on the data cost value and the smoothness cost value.

18 Claims, 9 Drawing Sheets

(56) References Cited

U.S. PATENT DOCUMENTS

| | | | |
|---|---|---|---|
| 8,798,965 B2* | 8/2014 | Quan | G06T 17/05 345/419 |
| 8,933,925 B2* | 1/2015 | Sinha | G06T 7/0065 345/419 |
| 9,571,819 B1* | 2/2017 | Barron | H04N 13/0239 |
| 2005/0047663 A1 | 3/2005 | Keenan et al. | |
| 2006/0204104 A1* | 9/2006 | Liu | G06T 7/593 382/194 |
| 2007/0076016 A1* | 4/2007 | Agarwala | G06T 3/4038 345/629 |
| 2009/0067705 A1* | 3/2009 | Yu | G06T 7/55 382/154 |
| 2010/0201682 A1* | 8/2010 | Quan | G06K 9/00704 345/419 |
| 2010/0220932 A1* | 9/2010 | Zhang | G06K 9/6297 382/209 |
| 2010/0315412 A1* | 12/2010 | Sinha | G06T 15/00 345/419 |
| 2011/0110583 A1* | 5/2011 | Zhang | G06T 7/593 382/154 |
| 2011/0176722 A1* | 7/2011 | Sizintsev | G06T 7/97 382/154 |
| 2011/0234756 A1* | 9/2011 | Adler | G06T 5/002 348/46 |
| 2011/0285701 A1* | 11/2011 | Chen | G06K 9/4638 345/419 |
| 2011/0310970 A1* | 12/2011 | Lee | H04N 19/51 375/240.16 |
| 2012/0039525 A1* | 2/2012 | Tian | G06T 5/005 382/154 |
| 2014/0078254 A1 | 3/2014 | Lin et al. | |
| 2014/0152776 A1* | 6/2014 | Cohen | H04N 13/0271 348/47 |
| 2014/0153816 A1* | 6/2014 | Cohen | G06T 7/0075 382/154 |
| 2014/0168215 A1* | 6/2014 | Cohen | G06T 7/593 345/420 |
| 2014/0169660 A1* | 6/2014 | Cohen | G06T 5/002 382/154 |
| 2014/0177903 A1* | 6/2014 | Price | G06T 7/0075 382/100 |
| 2014/0198977 A1 | 7/2014 | Narasimha et al. | |
| 2014/0307925 A1* | 10/2014 | Uemori | G01B 11/14 382/106 |
| 2015/0063682 A1* | 3/2015 | Nguyen | H04N 13/0048 382/154 |
| 2015/0249791 A1* | 9/2015 | Somanath | H04N 5/262 348/218.1 |
| 2016/0019437 A1 | 1/2016 | Choi et al. | |

FOREIGN PATENT DOCUMENTS

| | | |
|---|---|---|
| KR | 100428604 B1 | 4/2004 |
| KR | 1020110015142 A | 2/2011 |
| KR | 1020120068470 A | 6/2012 |

OTHER PUBLICATIONS

Q. Yang, "A Non-Local Cost Aggregation Method for Stereo Matching", IEEE, Jun. 2012, 8 pages.

X. Mei,"Segment-Tree based Cost Aggregation for Stereo Matching", Computer Vision Foundation, IEEE, Jun. 2013, 8 pages.

K. Yoon, "Adaptive Support-Weight Approach for Correspondence Search", IEEE Transactions on Pattern Analysis and Machine Intelligence, vol. 28, No. 4, Apr. 2006, 7 pages.

C. Rhemann, "Fast Cost-Volume Filtering for Visual Correspondence and Beyond", IEEE, Aug. 2012, 8 pages.

K. Zhang, "Cross-Scale Cost Aggregation for Stereo Matching", 2013 IEEE Conference on Computer Vision and Pattern Recognition, 8 pages.

J. Sun, "Stereo Matching Using Belief Propagation", A. Heyden et al. (Eds.): ECCV 2002, LNCS 2351, pp. 510-524, 2002, Springer-Verlag Berlin Heidelberg 2002, 15 pages.

D. Min,"Cost Aggregation and Occlusion Handling With WLS in Stereo Matching", 2008 IEEE, 12 pages.

J. Sun, "Symmetric Stereo Matching for Occlusion Handling", 2005 IEEE, 8 pages.

V. Kolmogorov, "Computing Visual Correspondence with Occlusions via Graph Cuts", Cornell University Ithaca, NY, USA, 2001, 37 pages.

Y. Boykov, "Fast Approximate Energy Minimization via Graph Cuts", IEEE, Nov. 2001, 8 pages.

* cited by examiner

METHOD AND APPARATUS FOR MATCHING STEREO IMAGES

CROSS-REFERENCE TO RELATED APPLICATION

This application claims the priority benefit of Korean Patent Application No. 10-2014-0162525, filed on Nov. 20, 2014, in the Korean Intellectual Property Office, the entire contents of which are incorporated herein by reference.

BACKGROUND

1. Field

Example embodiments relate to a method and/or apparatus for matching stereo images, and more particularly, to a method and/or apparatus for matching stereo images to reduce (or alternatively, minimize) a computation cost for matching stereo images.

2. Description of the Related Art

A sight of a human is one of the senses used to obtain information on a neighborhood environment. A human may recognize a position of an object, and remoteness and nearness of the object through both eyes. In detail, visual information obtained through both eyes may be synthesized into a single piece of distance information.

A stereo camera system may be used to implement such a visual structure as a mechanism. The stereo camera system may perform stereo matching or stereo image matching with respect to images acquired using two cameras. In the stereo matching process, the stereo camera system may obtain binocular disparity maps based on a binocular disparity between the two cameras.

SUMMARY

Some example embodiments relate to a method of matching stereo images.

In some example embodiments, the method may include calculating a data cost (or data cost value) for each of a plurality of images acquired by photographing an identical scene from different points of view, calculating a smoothness cost (or smoothness cost value) for each of the plurality of images, and matching pixels among the plurality of images based on the data cost and the smoothness cost. The data cost may be calculated based on a geometric relationship among the pixels, the geometric relationship being determined based on binocular disparity information of the plurality of images, and the smoothness cost may be calculated based on a similarity of binocular disparities between a pixel of an image and neighboring pixels of the pixel.

The matching may include matching the pixels using a mean field approximation.

The matching may include generating a posterior probability distribution based on the data cost and the smoothness cost, and matching the pixels to maximize the posterior probability distribution.

The matching of the pixels to maximize the posterior probability distribution may include converting the posterior probability distribution into another probability distribution including independent components, and matching the pixels to maximize the other probability distribution.

The other probability distribution may be configured to minimize a Kullback-Leibler divergence between the other probability distribution and the posterior probability distribution.

The components may correspond to probability distributions, respectively, and a sum of the probability distributions may correspond to "1".

The neighboring pixels may correspond to all pixels within an image including the pixel.

A cost may be assigned to each of at least one pixel of an image based on the geometric relationship when calculating the data cost.

An initial desired (or alternatively, predetermined) cost (or initial cost value) may be assigned to a pixel having an impossible structure based on the geometric relationship when calculating the data cost.

The initial desired (or alternatively, predetermined) cost may be adjusted by iteratively performing the matching of the pixels.

The matching may include matching the pixels to minimize a sum of the data cost and the smoothness cost.

The matching may include matching the pixels to minimize the sum by applying a regularization coefficient to the smoothness cost.

At least one parameter of a data cost function used to calculate the data cost and at least one parameter of a smoothness cost function used to calculate the smoothness cost may be values trained using a ground-truth binocular disparity map.

The method may further include converting scales of the plurality of images and scales of binocular disparity maps of the plurality of images into at least one scale, and the matching may include matching the pixels based on data costs for the scale-converted plurality of images and smoothness costs for the scale-converted binocular disparity maps.

The method may further include generating respective binocular disparity maps of the plurality of images based on the matched pixels.

The method may further include setting a neighborhood relationship for a pixel of an image on other images, among images photographed consecutively from an identical point of view.

The matching may include matching the pixels based on the pixel and the neighborhood relationship of the pixel.

Other example embodiments relate to an apparatus for matching stereo images.

In some example embodiments, the apparatus may include a data cost calculator configured to calculate a data cost for each of a plurality of images acquired by photographing an identical scene from different points of view, a smoothness cost calculator configured to calculate a smoothness cost for each of the plurality of images, and a matcher configured to match pixels among the plurality of images based on the data cost and the smoothness cost. The data cost calculator may be configured to calculate the data cost based on a geometric relationship among the pixels, the geometric relationship being determined based on binocular disparity information of the plurality of images, and the smoothness cost calculator may be configured to calculate the smoothness cost based on a similarity of binocular disparities between a pixel of an image and neighboring pixels of the pixel. The matcher may be configured to match the pixels using a mean field approximation.

The matcher may be configured to generate a posterior probability distribution based on the data cost and the smoothness cost, and match the pixels to maximize the posterior probability distribution.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION OF EXAMPLE EMBODIMENTS

Figure 1:
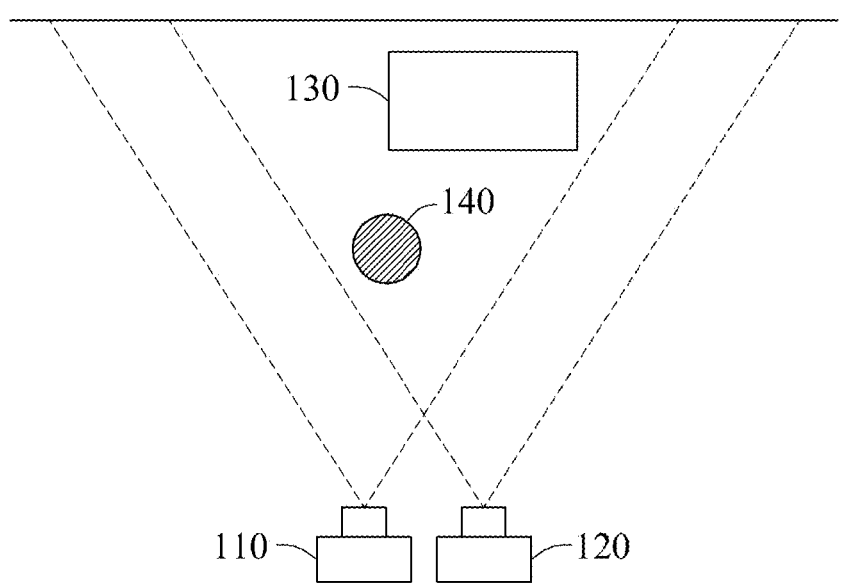
FIG. 1 illustrates a disposition of cameras to be used to photograph stereo images according to example embodiments.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of on e or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be execute d in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 illustrates a disposition of cameras to be used to photograph stereo images according to example embodiments.

Stereo matching or stereo image matching refers to matching of images obtained by photographing an identical scene from at least two different points of view. The stereo image matching may involve determining a correspondence between pixels of the images.

Referring to FIG. 1, a first camera 110 and a second camera 120 may photograph an identical scene from different points of view.

The scene may include a background 130 and a foreground 140.

The first camera 110 and the second camera 120 may be disposed in parallel in a horizontal direction.

Figure 2:
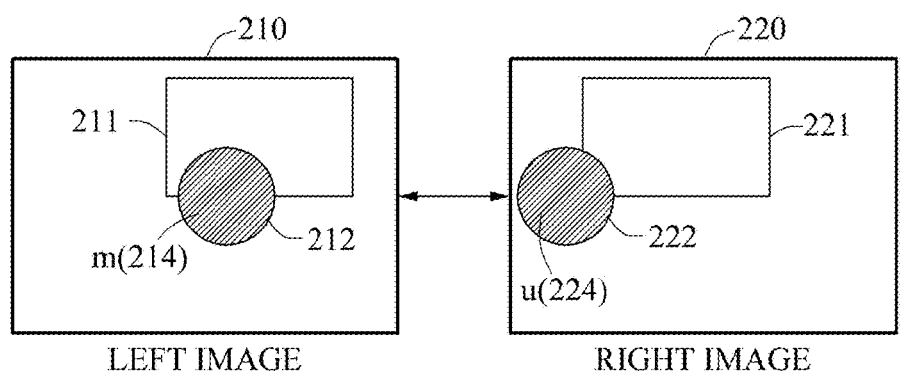
FIG. 2 illustrates generated stereo images according to example embodiments.

Images photographed by the first camera 110 and the second camera 120 are illustrated in FIG. 2.

FIG. 2 illustrates generated stereo images according to example embodiments.

Referring to FIG. 2, a left image 210 may be an image photographed by the first camera 110 of FIG. 1.

A right image 220 may be an image photographed by the second camera 120 of FIG. 1.

Since the first camera 110 and the second camera 120 have different points of view, the left image 210 and the right image 220 may include the background 130 and the foreground 140 at different positions.

Since the left image 210 and the second image 220 are obtained by photographing the identical scene, the left image 210 and the second image 220 may include identical components.

The foreground 140 may correspond to a first foreground 212 and a second foreground 222. Since the first foreground 212 and the second foreground 222 are values obtained by photographing the identical foreground 140, pixels of the first ground 212 may correspond to pixels of the second foreground 222.

For example, a pixel m 214 of the first foreground 212 may correspond to a pixel u 224 of the second foreground 222.

The background 130 may correspond to a first background 211 and a second background 221. Since the first background 211 and the second background 221 are values obtained by photographing the identical background 130, pixels of the first background 211 may correspond to pixels of the second background 221.

When stereo matching is performed between the left image 210 and the right image 220, a displacement or a disparity between the pixel m 214 of the first foreground 212 and the pixel u 224 of the second foreground 222 may be calculated. When the displacement or the disparity is calculated, actual distances from the first camera 110 and the second camera 120 to the foreground 140 may be calculated.

The disparity may occur only in a horizontal direction (i.e., not in a vertical direction).

In the process of performing stereo matching between the left image 210 and the right image 220, a binocular disparity map of the left image 210 and a binocular disparity map of the right image 220 may be estimated. Hereinafter, a binocular disparity map may be simply referred to as a disparity map.

Figure 3:
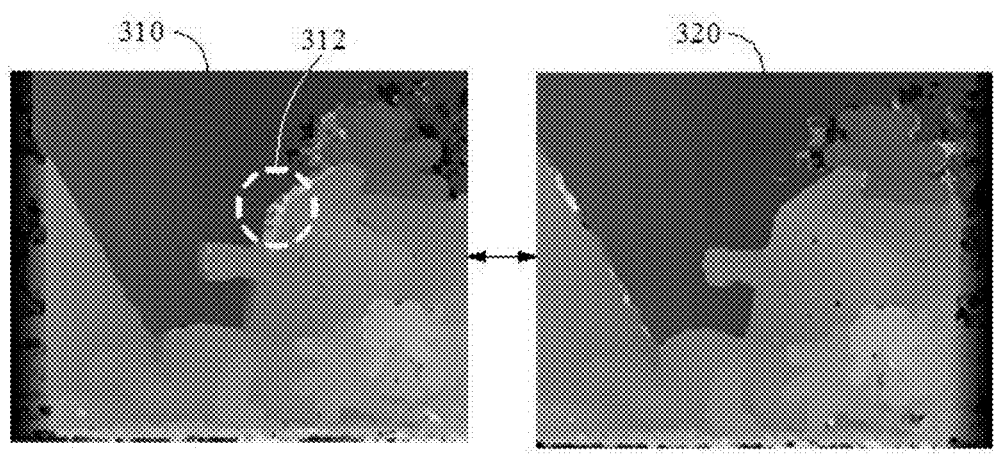
FIG. 3 illustrates binocular disparity maps generated by matching stereo images according to example embodiments.

FIG. 3 illustrates disparity maps generated by matching stereo images according to example embodiments.

Referring to FIG. 3, disparity maps 310 and 320 may be estimated by a method of estimating a disparity map using a left image and a right image.

A disparity map estimated by the aforementioned method may be vulnerable to an occlusion occurring between a left image and a right image. A pixel present in an area in which an occlusion occurs may not be matched to another pixel. When the pixel in the occlusion area is processed identically to a pixel to be matched, an error 312 may occur.

To reduce the error 312, a method that considers a geometry consistency between images may be used.

To reduce the error 312, a method of estimating a disparity map through an optimization process may be used.

A method of matching stereo images to reduce the error 312 will be described in detail with reference to FIGS. 4 through 9.

Figure 4:
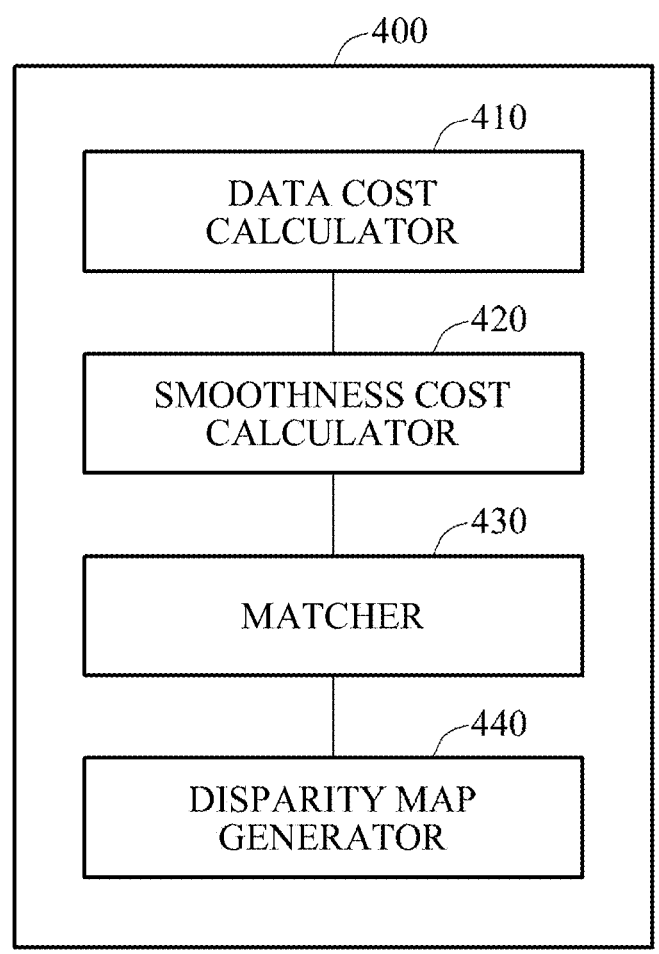
FIG. 4 is a block diagram illustrating a configuration of an apparatus for matching stereo images according to example embodiments.

FIG. 4 is a block diagram illustrating a configuration of an apparatus for matching stereo images according to example embodiments.

Referring to FIG. 4, an apparatus 400 for matching stereo images may include a data cost calculator 410, a smoothness cost calculator 420, a matcher 430, and a disparity map generator 440.

The data cost calculator 410, the smoothness cost calculator 420, the matcher 430, and the disparity map generator 440 will be described in detail with reference to FIGS. 5 through 9.

Figure 5:
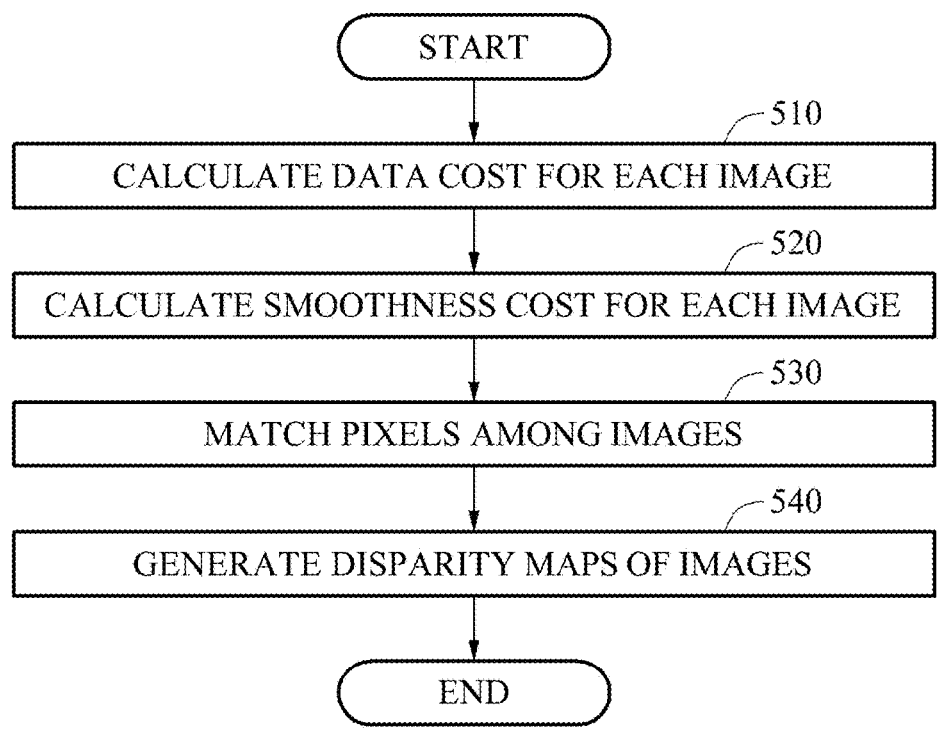
FIG. 5 is a flowchart illustrating a method of matching stereo images according to example embodiments.

FIG. 5 is a flowchart illustrating a method of matching stereo images according to example embodiments.

Referring to FIG. 5, in operation 510, the data cost calculator 410 may calculate a data cost (or a data cost value) for each of a plurality of images. For example, the data cost calculator 410 may generate a data cost function used to calculate the data cost for each of the plurality of images. The data cost (or the data cost value) may be indicative of an amount of computational energy desired for finding a color difference between the plurality of images (e.g., finding a difference in color values of a pixel in consecutively photographed images).

The plurality of images may be a left image and a right image. The plurality of images may be obtained by photographing an identical scene from different points of view.

The data cost may be calculated based on a geometric relationship among used pixels, and the geometric relationship may be determined based on disparity information of the plurality of images.

A initial cost (or initial cost value) may be assigned to at least one pixel of an image based on a geometric relationship among corresponding pixels when calculating the data cost.

For example, the data cost calculator 410 may estimate a first disparity map of a left image and a second disparity map of a right image (e.g., simultaneously), and generate a data cost (or data cost value) for the left image based on geometric information between the first disparity map and the second disparity map, as expressed by Equation 1. Equation 1 may be a data cost function for the left image.

$$E_{data}^l(d^l, d^r; I^l, I^r) = \sum_m \begin{cases} c_o, & \text{if } d_m^l < d_{m-d_m^l}^r \text{ [occluded]} \\ \phi(I_m^l, I_{m-d_m}^r), & \text{if } d_m^l = d_{m-d_m^l}^r \text{ [matched]} \\ c_i, & \text{if } d_m^l > d_{m-d_m^l}^r \text{ [inconsistent]} \end{cases} \quad \text{[Equation 1]}$$

In Equation 1, $E_{data}^l(d^l,d^r;I^l,I^r)$ denotes a data cost (or data cost value) for a left image.

In Equation 1, $I^l$ denotes the left image, $I^r$ denotes a right image, $d^l$ denotes a first disparity map of the left image, $d^r$ denotes a second disparity map of the left image, and m denotes a pixel included in the left image.

Further, $d_m^l$ denotes a disparity value of a pixel corresponding to the pixel m of the left image, among pixels of the first disparity map. The pixel m of the left image and the corresponding pixel of the first disparity map may have identical coordinate values.

Still referring to Equation 1, $d_{m-d_m}^{r}$ denotes a disparity value of a pixel corresponding to the pixel m, among pixels of the second disparity map. The first and second disparity maps may be associated with consecutively photographed images, respectively.

In Equation 1, $c_o$ denotes a desired (or alternatively, predetermined) value.

In Equation 1, $\phi(I_m^l, I_{m-d_m}^r)$ denotes a difference between a color value of the pixel m of the left image and a color value of a pixel of the right image corresponding to the pixel m. $\phi(I_m^l, I_{m-d_m}^r)$ may be calculated using Equation 2.

$$\phi(I_m^l, I_{m-d_m}^r) = \frac{1}{\sigma} \|I_m^l - I_{m-d_m}^r\| \quad \text{[Equation 2]}$$

A difference between pixels may be calculated based on a difference between respective color values of corresponding pixels. In Equation 2, σ denotes a constant (e.g., a preset constant).

In Equation 2, $c_i$ denotes a constant to be added when a geometrically inconsistent condition is satisfied. Ideally, $c_i$ has an infinite value, however, $c_i$ may have a finite constant value in a practical application of the system.

For example, if a process of calculating a data cost is performed iteratively, $c_i$ may be set to gradually increase over the iterations. In another example, $c_i$ may be adjusted iteratively when performing operation 530.

When calculating the data cost, an initial desired (or alternatively, predetermined) cost (or initial cost value) may be assigned to a pixel having an impossible structure based on a geometric relationship, for example, a pixel satisfying an inconsistent condition. The initial desired (or alternatively, predetermined) cost may be $c_i$.

Similar to the data cost for the left image, a data cost for the right image may be generated using Equation 3. Equation 3 may be a data cost function for the right image.

$$E_{data}^r(d^l, d^r; I^l, I^r) = \sum_u \begin{cases} c_o, & \text{if } d_u^r < d_{u+d_u^l}^r \text{ [occluded]} \\ \phi(I_{u+d_u^r}^l, I_u^r), & \text{if } d_u^r = d_{u+d_u^l}^r \text{ [matched]} \\ c_i, & \text{if } d_u^r > d_{u+d_u^l}^r \text{ [inconsistent]} \end{cases} \quad \text{[Equation 3]}$$

In Equation 3, $E_{data}^r(d^l,d^r;I^l,I^r)$ denotes a data cost (or data cost value) for a right image, and u denotes a pixel included in the right image.

In Equation 3, $d_u^r$ denotes a disparity value of a pixel corresponding to the pixel u of the right image, among pixels of the second disparity map. The pixel u of the right image and the corresponding pixel of the second disparity map may have identical coordinate values.

In Equation 3, $d_{u+d_u^l}^l$ denotes a disparity value of a pixel corresponding to the pixel u, among pixels of the first disparity map. The first and second disparity maps may be associated with consecutively photographed images, respectively.

The data cost calculator 410 may take into account one or more additional conditions to improve a calculated a data cost.

For example, the data cost calculator 410 may set a maximum value of a data cost to be calculated. In another example, the data cost calculator 410 may use a patch of an image including a pixel, rather than comparing a single pixel. In still another example, the data cost calculator 410 may apply weights to a plurality of measured values.

In operation 520, the smoothness cost calculator 420 may calculate a smoothness cost (or smoothness cost value) for each of the plurality of images. For example, the smoothness cost calculator 420 may generate a smoothness cost function used to calculate the smoothness cost for each of the plurality of images. The smoothness cost (or the smoothness cost value) may be indicative of an amount of computational energy desired for smoothing the plurality of images (e.g., by applying filters to pixels in each image).

A smoothness cost may be calculated based on a similarity of disparity values between a desired (or alternatively, predetermined) pixel of an image and neighboring pixels of the desired (or alternatively, predetermined) pixel. The smoothness cost calculator 420 may generate a smoothness cost for the left image, as expressed by Equation 4. Equation 4 may be a smoothness cost function for the left image.

$$E_{smoothness}^l(d^l; I^l) = \sum_m \sum_{n \in N_m} w_{mn}^l \psi(d_m^l, d_n^l) \quad \text{[Equation 4]}$$

In Equation 4, $E_{smoothness}^l(d^l;I^l)$ denotes a smoothness cost for a left image.

In Equation 4, $N_m$ denotes a set of neighboring pixels of a set pixel m. For example, the neighboring pixels may be pixels on left, right, upper, and lower sides of the pixel m. In another example, the neighboring pixels may be all pixels of the left image including the pixel m. In Equation 4, n denotes a pixel included in $N_m$.

In Equation 4, $w_{mn}^l$ denotes a weight to be added when $d_m^l$ differs from $d_n^l$.

In Equation 4, $w_{mn}^l$ may be set to be relatively great when the pixel m and the pixel n constitute an identical object, $w_{mn}^l$ may be set to be close to "0" when the pixel m and the pixel n do not constitute an identical object, and $w_{mn}^l$ may be set by referring to the left image.

For example, $w_{mn}^l$ may be set using a bilateral filter coefficient, or a guided filter coefficient. In another example, $w_{mn}^l$ may be set by arbitrarily combining the bilateral filter coefficient and the guided filter coefficient.

For example, when the neighboring pixels correspond to all pixels of the left image including the pixel m, the bilateral filter coefficient or the guided filter coefficient may be used as $w_{mn}^l$. In another example, when the neighboring pixels correspond to all pixels of the left image including the pixel m, an arbitrary combination of the bilateral filter coefficient and the guided filter coefficient may be used as $w_{mn}^l$.

In an example, $\psi(d_m^l, d_n^l)$ may be calculated using Equation 5.

$$\psi(d_m^l, d_n^l) = \begin{cases} 0, & \text{if } d_m^l = d_n^l, \\ 1, & \text{otherwise} \end{cases} \quad \text{[Equation 5]}$$

In another example, $\psi(d_m^l, d_n^l)$ may be calculated using Equation 6.

$$\psi(d_m^l, d_n^l) = |d_m^l - d_n^l| \quad \text{[Equation 6]}$$

Similar to the smoothness cost for the left image, a smoothness cost for the right image may be generated using Equation 7. Equation 7 may be a smoothness cost function for the right image.

$$E^r_{smoothness}(d^r; I^r) = \sum_u \sum_{v \in N_u} w^r_{uv} \psi(d^r_m, d^r_n)$$ [Equation 7]

The descriptions of the smoothness cost for the left image may be applicable to the smoothness cost for the right image.

In operation 530, the matcher 430 may match pixels among the plurality of images based on the data cost and the smoothness cost. For example, the matcher 430 may match the pixels among the plurality of images using the data cost function and the smoothness cost function.

The matcher 430 may match the pixels to reduce (or alternatively, minimize) a sum of the data cost and the smoothness cost. In detail, operation 530 may be a process that reduces (or alternatively, minimizes) computing energy used in a stereo matching process.

The matcher 430 may estimate disparity maps of the plurality of images to match the pixels. The disparity maps may be generated to reduce (or alternatively, minimize) the sum of the data cost and the smoothness cost. In detail, the matcher 430 may estimate the disparity maps to reduce (or alternatively, minimize) a sum of a data cost and a smoothness cost calculated based on the disparity maps.

For example, the matcher 430 may match the pixels among the plurality of images to reduce (or alternatively, minimize) a value of Equation 8.

$$E(d^l, d^r; I^l, I^r) = \lambda(E^l_{smoothness}(d^l; I^l) + E^r_{smoothness}(d^r; I^r)) + E^l_{data}(d^l, d^r; I^l, I^r) + E^r_{data}(d^l, d^r; I^l, I^r)$$ [Equation 8]

In Equation 8, $E(d^l, d^r; I^l, I^r)$ denotes an optimization cost.

In Equation 8, $\lambda$ denotes a regularization coefficient between a smoothness cost and a data cost. The matcher 430 may match the pixels to minimize the sum by applying the regularization coefficient to the smoothness cost.

A method of matching pixels among a plurality of images based on a data cost and a smoothness cost will be described in detail with reference to FIGS. 6 and 7.

In operation 540, the disparity map generator 440 may generate respective disparity maps of the plurality of images based on the matched pixels.

Figure 6:
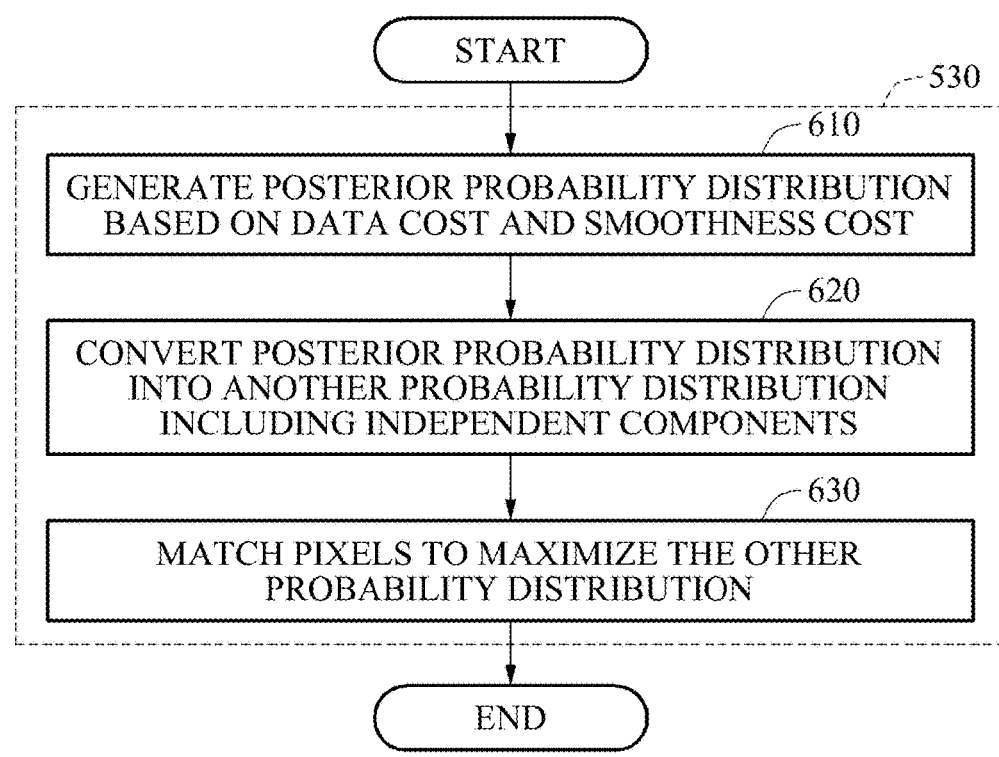
FIG. 6 is a flowchart illustrating a method of matching pixels among a plurality of images according to example embodiments.

FIG. 6 is a flowchart illustrating a method of matching pixels among a plurality of images according to example embodiments.

Operation 530 of FIG. 5 may include operations 610 through 630 of FIG. 6.

Operations 610 through 630 may be operations of performing a method of matching pixels using a mean field approximation.

Referring to FIG. 6, in operation 610, the matcher 430 may generate a posterior probability distribution based on a data cost and a smoothness cost.

The posterior probability distribution may be expressed by Equation 9.

$$P(d^l, d^r | I^l, I^r) = \frac{1}{Z} \exp(-E(d^l, d^r; I^l, I^r))$$ [Equation 9]

In Equation 9, Z denotes a normalization constant or a partition function that makes the posterior probability distribution $P(d^l, d^r | I^l, I^r)$ valid as a probability distribution.

The matcher 430 may estimate a first disparity map $d^l$ and a second disparity map $d^r$ to improve (or alternatively, maximize) the posterior probability distribution. In detail, the matcher 430 may match the pixels to improve (or alternatively, maximize) the posterior probability distribution.

In operation 620, the matcher 430 may convert the posterior probability distribution into another probability distribution.

The other probability distribution may include independent components.

The other probability distribution may be defined as expressed by Equation 10.

$$Q(d^l, d^r) = \prod_{m,u} Q^l_m(d^l_m) Q^r_u(d^r_u)$$ [Equation 10]

The other probability distribution may be a probability distribution that reduces (or alternatively, minimizes) a Kullback-Leibler divergence between the other probability distribution and the posterior probability distribution.

Since $Q^l_m(d^l_m)$ and $Q^r_u(d^r_u)$ are to be valid as probability distributions, a sum of $Q^l_m(d^l_m)$ and $Q^r_u(d^r_u)$ may be "1".

In operation 630, the matcher 430 may match the pixels among the plurality of images to improve (or alternatively, maximize) the other probability distribution.

When obtaining a condition (e.g., an optimization condition) for $Q^l_m(d^l_m)$ and $Q^r_u(d^r_u)$ using a Lagrange multiplier method, $Q^l_m(d^l_m)$ and $Q^r_u(d^r_u)$ may be defined as expressed by Equation 11.

$$Q^l_m(d^l_m) = \frac{1}{Z^l_m} \exp(-E_{d^l, d^r \setminus \{d^l_m\}}[E(d^l, d^r; I^l, I^r)])$$

$$Q^r_u(d^r_u) = \frac{1}{Z^r_u} \exp(-E_{d^l, d^r \setminus \{d^r_u\}}[E(d^l, d^r; I^l, I^r)])$$ [Equation 11]

In Equation 11, an operator E denotes an expected value on probability variables of a subscript thereof.

In Equation 11, $Z^l_m$ and $Z^r_u$ denote constants.

A solution of an equation satisfying Equation 11 may be obtained using an iterative method, rather than a closed-form method.

When $Q^l_m(d^l_m)$ and $Q^r_u(d^r_u)$ converge through iterations, the first disparity map $d^l$ and the second disparity map $d^r$ that improve (or alternatively, maximize) $Q(d^l, d^r)$ may be estimated.

Since components of $Q(d^l, d^r)$ may be independent from each other, the solution may be obtained by calculating Equation 12.

$$\hat{d}^l_m = \underset{d^l_m}{\operatorname{argmax}} Q^l_m(d^l_m)$$

$$\hat{d}^r_u = \underset{d^r_u}{\operatorname{argmax}} Q^r_u(d^r_u)$$ [Equation 12]

Each of $Q^l_m$ and $Q^r_u$ may be a one-dimensional function and thus, the solution thereof may be easily calculated.

At least one parameter of the data cost function and at least one parameter of the smoothness cost function may be values trained using a ground-truth disparity map. The ground-truth disparity map may be a disparity map generated by a camera capable of calculating a disparity.

For example, parameters $\lambda$, $\sigma$, $c_o$, and $c_i$ may be values trained using the ground-truth disparity map. The parameters may be defined as expressed by Equation 13.

$$\Theta = (\lambda, \sigma, c_o, c_i) \quad \text{[Equation 13]}$$

In equation, $\Theta$, which reduces (or alternatively, minimizes) a mean value of errors with an estimated disparity map, may be calculated based on N items of training data for which a ground-truth disparity map exists, as expressed by Equation 14.

$$\Theta^* = \arg\min_{\Theta} \frac{1}{N} \sum_{j=1}^{N} f_{\Theta}\left(d_j^l, d_j^r, \hat{d}_j^l, \hat{d}_j^r\right) \quad \text{[Equation 14]}$$

In Equation 14, $f_\Theta$ denotes an error function to be used to compare a ground-truth disparity map to an estimated disparity map. The error function may indicate a proportion of unmatched pixels between the ground-truth disparity map and the estimated disparity map.

For example, a coordinate descent method or a particle swarm optimization may be used as a method of training parameters.

Figure 7:
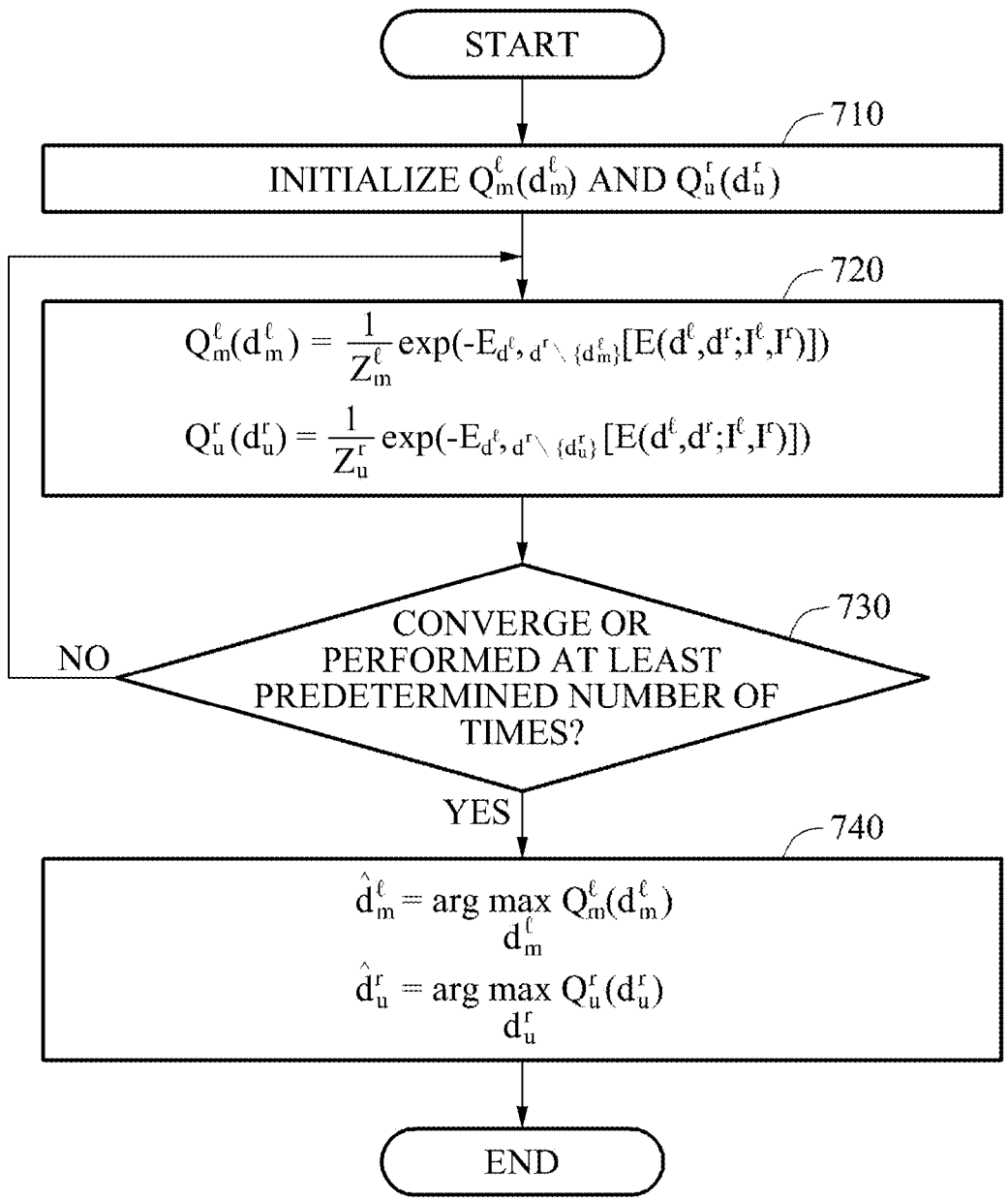
FIG. 7 is a flowchart illustrating a method of optimizing components of another probability distribution according to example embodiments.

FIG. 7 is a flowchart illustrating a method of improving (or alternatively, optimizing) components of another probability distribution according to example embodiments.

Operation 630 of FIG. 6 may include operations 710 through 740 of FIG. 7.

Referring to FIG. 7, in operation 710, the matcher 430 may initialize values of $Q_m^l(d_m^l)$ and $Q_u^r(d_u^r)$.

In operation 720, the matcher 430 may calculate the values of $Q_m^l(d_m^l)$ and $Q_u^r(d_u^r)$, respectively.

In operation 730, the matcher 430 may determine whether the values of $Q_m^l(d_m^l)$ and $Q_u^r(d_u^r)$ converge, or whether operation 720 is performed at least a desired (or alternatively, predetermined) number of times.

When the values of $Q_m^l(d_m^l)$ and $Q_u^r(d_u^r)$ converge, or when operation 720 is performed at least the desired (or alternatively, predetermined) number of times, operation 740 may be performed.

In operation 740, the matcher 430 may estimate respective disparity maps.

The matcher 430 may match the pixels among the plurality of images using the estimated disparity maps.

The disparity map generator 440 may generate respective disparity maps of the plurality of images based on the matched pixels.

Figure 8:
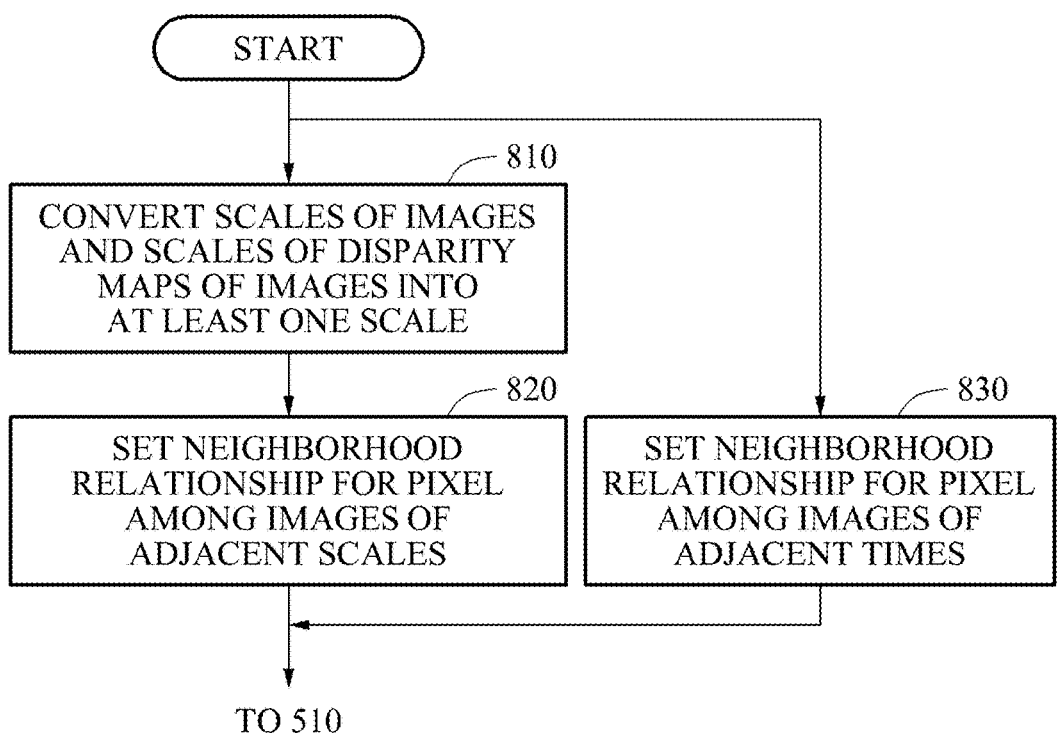
FIG. 8 is a flowchart illustrating a method of setting a neighborhood relationship for a pixel according to example embodiments.

FIG. 8 is a flowchart illustrating a method of setting a neighborhood relationship for a pixel according to example embodiments.

When a mean field approximation is used to obtain a smoothness cost, a computational complexity may greatly decrease and thus, a number of neighboring pixels of a pixel may considerably increase.

Operations 810 and 820, and operation 830 of FIG. 8 may be selectively performed or performed in parallel.

The apparatus 400 of FIG. 4 for matching stereo images may further include a setting unit (not shown).

In operation 810, the setting unit may convert scales of a plurality of images and scales of disparity maps of the plurality of images into at least one scale.

In operation 820, the setting unit may set a neighborhood relationship for a pixel among images of adjacent scales.

In operation 830, the setting unit may set the neighborhood relationship for the pixel among frames or images of adjacent times when performing stereo image matching with respect to a video. For example, the frames or the images of the adjacent times may be consecutively photographed or consecutively generated frames or images.

The setting unit may set a neighborhood relationship for a pixel of an image on other images, among images consecutively photographed from an identical point of view.

For example, the setting unit may set a neighborhood relationship for a pixel A of a t-th image with respect to a plurality of pixels of a (t+1)-th image. Coordinates of the plurality of pixels of the (t+1)-th image may be within a desired (or alternatively, predetermined) distance from coordinates of the pixel A within the image.

When the frames or the images of the adjacent times are connected, an error in a disparity map may be reduced along a time axis.

In operation 510, the data cost calculator 410 may calculate the data cost using the set neighborhood relationship.

In operation 520, the smoothness cost calculator 420 may calculate the smoothness cost using the set neighborhood relationship.

In operation 530, the matcher 430 may match the pixels among the plurality of images based on the data cost and the smoothness cost generated using the neighborhood relationship. For example, the matcher 430 may match the pixels among the plurality of images using a data cost function and a smoothness cost function generated using the neighborhood relationship.

In an example, the matcher 430 may match the pixels among the plurality of images based on data costs for the scale-converted plurality of images and smoothness costs for the scale-converted disparity maps.

In another example, the matcher 430 may match the pixels among the plurality of images based on a pixel and a neighborhood relationship for the pixel when the neighborhood relationship for the pixel of an image is set with respect to other images, among images consecutively photographed from the identical point of view.

Figure 9:
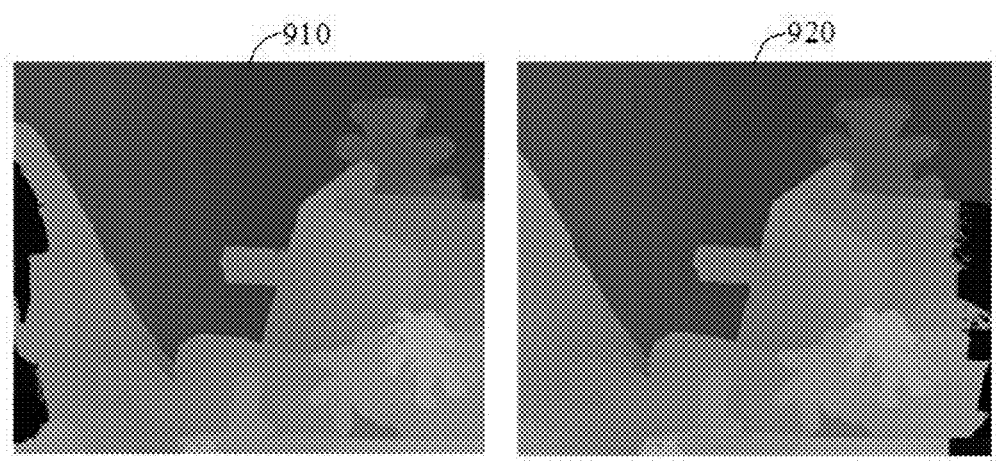
FIG. 9 illustrates binocular disparity maps generated by matching stereo images according to example embodiments.

FIG. 9 illustrates disparity maps generated by matching stereo images according to example embodiments.

FIG. 9 illustrates disparity maps generated by a method of matching pixels of a plurality of images using a mean field approximation. It should be understood that the disparity maps 910 and 920 may be disparity maps of a left image and a right image, respectively. Disparity maps 910 and 920 may be generated according to the above described methods in FIGS. 5-8. Disparity maps 910 and 920 may be used in determining a distance to an object in the plurality of images. When comparing FIG. 3 to FIG. 9, the error 312 having occurred in FIG. 3 is not present in FIG. 9, and thus, the distance calculation based on disparity maps 910 and 920 may be improved compared to a distance calculation based on disparity maps containing the error 312.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor (i.e., a special purpose processor), a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of matching stereo images, the method comprising:
    calculating a data cost value for each of a plurality of images, the plurality of images being acquired by photographing an identical scene from different points of view, the data cost value being indicative of an amount of computational energy for finding a color difference between the plurality of images;
    calculating a smoothness cost value for each of the plurality of images, the smoothness cost value being indicative of an amount of computational energy for smoothing the plurality of images; and
    matching pixels among the plurality of images based on the data cost value and the smoothness cost value,
    wherein
    the data cost value is calculated based on a geometric relationship among the pixels, the geometric relationship being determined based on binocular disparity information of the plurality of images,
    an initial cost value is assigned to a pixel having an impossible structure based on the geometric relationship when calculating the data cost value, and
    the smoothness cost value is calculated based on a similarity of binocular disparities between a selected pixel in a first image of the plurality of images and neighboring pixels of the selected pixel in the first image.

2. The method of claim 1, wherein the matching comprises matching the pixels using a mean field approximation.

3. The method of claim 1, wherein the matching comprises:
    generating a posterior probability distribution based on the data cost value and the smoothness cost value; and
    matching the pixels to maximize the posterior probability distribution.

4. The method of claim 1, wherein the neighboring pixels are pixels within an image comprising the selected pixel.

5. The method of claim 1, wherein the initial cost value is adjusted while iteratively performing the matching of the pixels.

6. The method of claim 1, wherein the matching comprises matching the pixels to minimize a sum of the data cost value and the smoothness cost value.

7. The method of claim 6, wherein the matching comprises matching the pixels to minimize the sum by applying a regularization coefficient to the smoothness cost value.

8. The method of claim 1, wherein at least one parameter of a data cost function used to calculate the data cost value and at least one parameter of a smoothness cost function used to calculate the smoothness cost value are values trained using a ground-truth binocular disparity map.

9. The method of claim 1, further comprising:
    converting scales of the plurality of images and scales of binocular disparity maps of the plurality of images into at least one scale,
    wherein the matching comprises matching the pixels based on data cost values for the scale-converted plurality of images and smoothness cost values for the scale-converted binocular disparity maps.

10. The method of claim 1, further comprising:
    generating respective binocular disparity maps of the plurality of images based on the matched pixels.

11. The method of claim 10, further comprising:
    determining a distance to an object in the plurality of images based on the respective binocular disparity maps.

12. The method of claim 1, further comprising:
setting a neighborhood relationship for a desired pixel of an image on other images from among images photographed consecutively from an identical point of view,
wherein the matching comprises matching the pixels based on the desired pixel and the neighborhood relationship of the desired pixel.

13. A method of matching stereo images, the method comprising:
calculating a data cost value for each of a plurality of images, the plurality of images being acquired by photographing an identical scene from different points of view, the data cost value being indicative of an amount of computational energy for finding a color difference between the plurality of images;
calculating a smoothness cost value for each of the plurality of images, the smoothness cost value being indicative of an amount of computational energy for smoothing the plurality of images; and
matching pixels among the plurality of images based on the data cost value and the smoothness cost value,
wherein the data cost value is calculated based on a geometric relationship among the pixels, the geometric relationship being determined based on binocular disparity information of the plurality of images, and
the smoothness cost value is calculated based on a similarity of binocular disparities between a selected pixel in a first image of the plurality of images and neighboring pixels of the selected pixel in the first image,
wherein the matching includes,
generating a posterior probability distribution based on the data cost value and the smoothness cost value;
matching the pixels to maximize the posterior probability distribution by
converting the posterior probability distribution into another probability distribution comprising independent to components, and
matching the pixels to maximize the another probability distribution.

14. The method of claim 13, wherein the other probability distribution is configured to minimize a Kullback-Leibler divergence between the other probability distribution and the posterior probability distribution.

15. The method of claim 13, wherein the independent components are probability distributions, respectively, and a sum of the probability distributions is "1".

16. An apparatus for matching stereo images, the apparatus comprising:
at least one processor; and
a memory having instructions stored thereon executed by the at least one processor to perform:
calculating a data cost value for each of a plurality of images, the plurality of images being acquired by photographing an identical scene from different points of view, the data cost value being indicative of an amount of computational energy for finding a color difference between the plurality of images;
calculating a smoothness cost value for each of the plurality of images, the smoothness cost value being indicative of an amount of computational energy for smoothing the plurality of images; and
matching pixels among the plurality of images based on the data cost value and the smoothness cost value,
wherein
the data cost value is calculated based on a geometric relationship among the pixels, the geometric relationship being determined based on binocular disparity information of the plurality of images,
an initial cost value is assigned to a pixel having an impossible structure based on the geometric relationship when calculating the data cost value, and
the smoothness cost value is calculated based on a similarity of binocular disparities between a selected pixel in a first image of the plurality of images and neighboring pixels of the selected pixel in a first image.

17. The apparatus of claim 16, wherein the matching includes matching the pixels using a mean field approximation.

18. The apparatus of claim 16, wherein the matching includes generating a posterior probability distribution based on the data cost value and the smoothness cost value, and match the pixels to maximize the posterior probability distribution.

* * * * *